United States Patent [19]

Fishman

[11] Patent Number: 4,477,475
[45] Date of Patent: Oct. 16, 1984

[54] METHOD FOR COLORING FISH FLESH

[76] Inventor: Steven J. Fishman, 25 Progress Pkwy., Maryland Heights, Mo. 63043

[21] Appl. No.: 426,626

[22] Filed: Sep. 29, 1982

[51] Int. Cl.³ .......................... A22C 25/00; A23L 1/27
[52] U.S. Cl. .................................... 426/250; 426/264; 426/281; 426/643; 426/652
[58] Field of Search ................ 426/250, 281, 643, 652

[56] References Cited

U.S. PATENT DOCUMENTS

| | | | |
|---|---|---|---|
| 3,493,392 | 2/1970 | Swartz | 426/281 |
| 3,556,809 | 1/1971 | Strandine et al. | 426/281 |
| 3,615,689 | 10/1971 | Malinow et al. | 426/281 |
| 3,649,299 | 3/1972 | Sholl | 426/281 |
| 3,683,789 | 8/1972 | Beasley | 99/256 |
| 3,687,058 | 8/1972 | Townsend | 99/257 |
| 3,769,037 | 10/1973 | Sholl | 426/281 |
| 3,863,556 | 2/1975 | Townsend | 99/487 |
| 3,922,355 | 11/1975 | Kotthoff | 426/281 X |
| 3,922,357 | 11/1975 | Townsend | 426/281 |
| 4,113,885 | 9/1978 | Zyss | 426/281 X |
| 4,139,645 | 2/1979 | Werner | 426/250 |
| 4,301,180 | 11/1981 | Simon et al. | 426/250 |
| 4,301,181 | 11/1981 | Simon et al. | 426/250 |
| 4,301,182 | 11/1981 | Simon et al. | 426/250 |
| 4,381,316 | 4/1983 | Brotsky et al. | 426/281 X |

OTHER PUBLICATIONS

Technical Manual, Townsend Model 1400 Injector, Mar., 1981.

Primary Examiner—Robert Yoncoskie
Attorney, Agent, or Firm—Senniger, Powers, Leavitt and Roedel

[57] ABSTRACT

A method for coloring fish flesh. An aqueous solution of a food dye is introduced into the flesh by injection via an array of a plurality of hypodermic needles. The flesh containing the injected dye is aged for a period of at least about two days thereby allowing the dye to diffuse through the flesh and produce a substantially even hue therethroughout.

16 Claims, 3 Drawing Figures

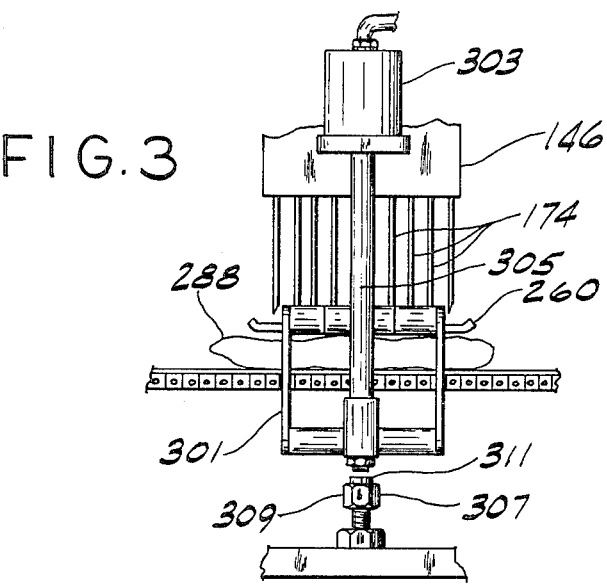

METHOD FOR COLORING FISH FLESH

BACKGROUND OF THE INVENTION

This invention relates to the field of processing fish products and more particularly to an improved method for imparting color to fish flesh.

In the manufacture of lox, sides of salmon are smoked and food coloring is added thereto to impart the characteristic salmon red color. Coloring of the lox is conventionally accomplished by immersion of cured fish slices in a color bath containing the proper mixture of food colors, followed by packing of the fish for shipment. Substantial labor is required because the fish must be sliced before immersion in the coloring solution.

There have been no suitable commercial processes for coloring whole fish or sides of fish. Often salmon of excellent flavor and texture has severely reduced market appeal where it exhibits a white color rather than the salmon red color which the consuming public has learned to expect. Hatchery salmon in particular tend to have white flesh. Pale to dark chums, caught late in the season, also suffer from deficient color which adversely affects their market value. In order to render white or pale salmon attractive to the consumer, it has been necessary to subject slices of the fish to the aforesaid immersion coloring process which, in this instance also, affords only low productivity. Whole fish or sides of fish cannot be satisfactorily colored by immersion because the rate of diffusion of colorant through the fish flesh is not adequate to produce an even hue within a reasonable time.

Accordingly, there has been an unfulfilled need in the art for improved processes for coloring fish flesh and for introducing curing solutions into the fish.

SUMMARY OF THE INVENTION

Among the several objects of the present invention, therefore, may be noted the provision of an improved process for coloring fish flesh; the provision of such a process which affords improved productivity in the introduction of color; the provision of such a process which is effective for coloring lox and other salmon products; the provision of such a process which is effective for coloring whole fish or sides of fish; the provision of such a process which affords an even, attractive color; and the provision of such a process which also provides for improved productivity in the introduction of curing additives to the fish.

Briefly, therefore, the present invention is directed to a process for coloring fish flesh, in which an aqueous solution of a food dye is introduced into the flesh. Such solution is injected into the flesh via an array of a plurality of hypodermic needles and the fish flesh containing the injected dye is aged for a period of at least about two days. The dye is thereby allowed to diffuse through the flesh and produce a substantially even hue therethroughout.

Other objects and features will be in part apparent and in part pointed out hereinafter.

BRIEF DESCRIPTION OF THE DRAWINGS

FIG. 3 is an enlarged detail view illustrating a stop arrangement for preventing the injection needle stripper plate of the apparatus of FIG. 1 from heavy impact on and damage to a slab of fish that is colored in accordance with the method of the invention.

Corresponding reference characters indicate corresponding parts in the several views of the drawings.

DESCRIPTION OF THE PREFERRED EMBODIMENTS

In accordance with the present invention, it has been discovered that fish flesh, particularly salmon, can be colored effectively by controlled injection of an aqueous food dye solution into the flesh using a plurality of hypodermic needles manifolded to a supply of the dye solution. More particularly it has been found that whole fish and sides of fish can be colored at high productivity, so that division of the fish into small slices prior to coloring is rendered unnecessary. Although the injection of dye solution does not immediately lead to uniform color distribution even where a multiplicity of injection needles are employed, it has further been discovered that aging of the fish flesh for a relatively short period of two to three days while in cure results in diffusion of the dye from the sites in which it initially concentrates upon delivery from the injection needles and thus leads to the development of a very even and attractive hue throughout the flesh.

In particular, it has been found that highly satisfactory results can be achieved using a Townsend model 1400 injector produced by Townsend Engineering Company, Des Moines, Iowa for carrying out the injection process. This machine is fully described in Townsend U.S. Pat. No. 3,687,058 which is expressly incorporated herein by reference.

Figure 1:
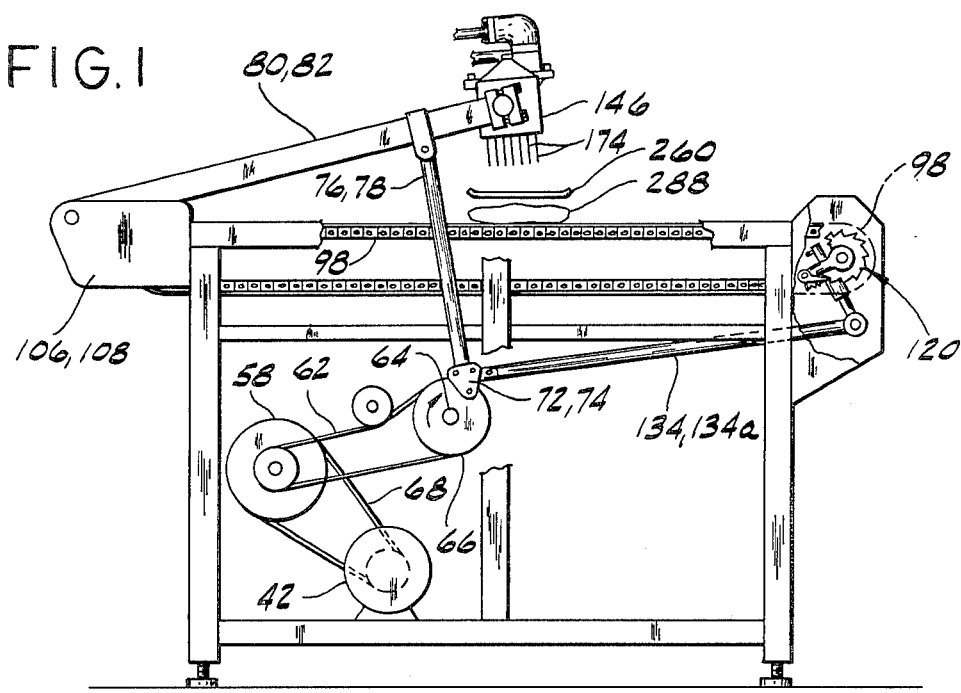
FIG. 1 is a schematic side elevation of an apparatus useful in practicing the method of the invention, with some parts broken away to better illustrate the operation of the apparatus.

Illustrated in the FIG. 1 of the drawings is a schematic depiction of the essential operating parts of the Townsend machine. Shown at 98 is an endless chain belt horizontal conveyor which receives slabs of fish 288 for positioning under a manifold 146 containing a supply of aqueous food dye solution for injection into the fish. A multiplicity of injector needles 174 are arrayed on the lower face of manifold 146 for penetrating the fish flesh upon lowering of the manifold. Needles 174 are in communication with aqueous dye solution contained within the manifold.

Manifold 146 is supported on the outer ends of arms 80 and 82 which are pivotally connected at their opposite ends to support plates 106 and 108. Arm 80 and plate 106 are on the near side of the machine as depicted in FIG. 1, while arm 82 and plate 108 are on the opposite side and respectively identical to, but obscured by, arm 80 and plate 106. At a point intermediate manifold 146 and plates 106 and 108, each of arms 80 and 82 is pivotally connected to the upper end of a rod (76, 78 respectively). The lower ends of rods 76 and 78 are connected to eccentrics 72 and 74 of cranks that are turned respectively on opposite ends of a shaft 64. Shaft 64 is turned by rotation of a pulley 66 connected by belts 62 and 68 via an intermediate pulley 58 to a drive motor 42. Rotation of the crank causes rods 76 and 78 to move in phase in a vertical reciprocal fashion. This in turn causes arms 80 and 82 carrying manifold 146 to reciprocate up and down and needles 174 to be alternately inserted into and removed from the slab of fish flesh 288 positioned on the conveyor 98 below manifold 146.

Another pair of arms 134 and 134a are each pivotally connected at one end to eccentrics 74 and 76, respectively, and connected at the other end to a pawl and ratchet wheel mechanism 120. This mechanism advances chain belt conveyor 98 as arms 134 and 134a reciprocate due to the cranking action of the eccentrics. By virtue of their attachment to the same eccentrics as arms 76 and 78, arms 134 and 134A reciprocate on the same cycle as manifold 146. However, the pawl and ratchet mechanism 120 is arranged for advancement of the conveyor to be out of phase with the lowering of the manifold, whereby slab 288 is held stationary as needles 174 are inserted into the fish flesh. Mechanism 120 further provides for the periodic advance of the conveyor to be less than the width of the array of needles on manifold 146, i.e. the dimension of the array in the direction of travel of the conveyor, so that needles 174 penetrate each slab 288 more than one time. Preferably, the conveyor is advanced between about one eighth and about one-half of the width of the array on each stroke. Most preferably, an advance of approximately one quarter of the width of the array is utilized.

A stripper plate 260 having a pattern of holes therein in registry with needles 174 is positioned between manifold 146 and conveyor 98. If the fish slab is lifted from the conveyor on the upward stroke of the manifold due to frictional engagement with the needles, the stripper plate acts as a barrier limiting the extent of such upward movement and effecting disengagement of the needles from the fish flesh. In one embodiment of the invention, the stripper plate may be fixed in position by rigid attachment to the conveyor support frame while in an alternative embodiment, as illustrated in FIG. 3, a yoke 301, driven by a pneumatic piston 303 and push rod 305, may be utilized for driving of the stripper plate downward in conjunction with the upward stroke of the manifold. In the latter arrangement, it is desirable to provide a fixed stop 307 on the frame aligned with and directly beneath push rod 305 so as to limit the downward stroke of the stripper plate and prevent damage to the fish. Stop 307 comprises a nut or collar 309 having a rubber stopper 311 inserted in the upper end thereof. Stopper 311 engages the push rod and absorbs the impact of stopping the downward stroke.

Preferably, the needles are arrayed on one eighth inch to one half inch centers most preferably approximately 3/16. The bore of the needles if preferably in the range of 0.003 to 0.006 millimeters.

Figure 2:
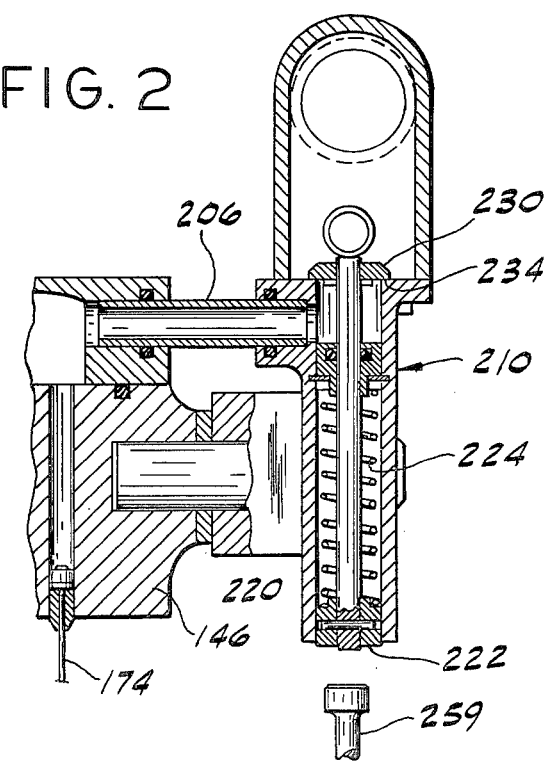
FIG. 2 is an enlarged detail view in section of a valve mechanism for delivering food dye solution to the injection needle manifold of the apparatus of FIG. 1.

In order to conserve the dye solution and minimize spraying of solution on the outside surfaces of the fish or onto surrounding surfaces of the injection machine, the dye solution is supplied to the manifold via the flow control arrangement illustrated in FIG. 2. Thus, a valve 210 and a supply line 206 are mounted on one end of the manifold and vertically reciprocate therewith upon each stroke of arms 76 and 78. Valve 210 includes a valve member 230 normally held closed against valve seat 234 by the force of a spring 224 on a vertically oriented valve stem 220 attached at its upper end to valve member 230. Stem 220 has a piston 222 attached to its lower end and is positioned vertically above a pin 259 that is mounted on the frame adjacent conveyor 98. On each downward stroke of arms 76 and 78, piston 222 engages pin 259, thereby restraining the downward movement of stem 220 and causing valve member 230 to separate from seat 234 and open the valve for delivery of dye solution through pipe 206, the interior of manifold 146 and needles 174 into the fish flesh. Upon the reciprocal upward movement of arms 76 and 78, piston 222 disengages from pin 259, thereby allowing spring 224 to close the valve and terminate supply of dye solution to the manifold. The bore of needles 174 is small enough so that atmospheric pressure prevents drainage of dye solution from the manifold when valve 210 is closed. The height of pin 259 is adjustable to provide for control of the period in which the valve is held open on the downward stroke of the manifold on arms 76 and 78. As shown in detail in U.S. Pat. No. 3,687,058, a pressure surge system may be provided on the inlet side of valve 210 to produce a surge of fluid flow during the period in which valve 210 is open.

In carrying out the method of the invention, a slab 288 of fish flesh is delivered to the conveyor, a supply of dye solution is placed in communication with the inlet side of valve 210, and motor 42 is started. Operation of the motor advances the conveyor by operation of arms 134, 134A and pawl and ratchet mechanism 120, thereby advancing the fish to an injection station immediately underneath manifold 146. Operation of arms 76 and 78 alternately moves manifold 146 downwardly, so that needles 174 penetrate the fish flesh, and upwardly so that the needles are removed from the flesh with or without the aid of stripper plate 260.

On the downward stroke, piston 222 engages pin 259, thereby restraining stem 220 and opening the valve. Under pressure from the supply of dye solution (and preferably with the aid of the pressure surge system illustrated in U.S. Pat. No. 3,687,058) dye solution flows through needles 174 and into the fish flesh while the needles are in the flesh. Upon the return stroke of the manifold, spring 224 causes the valve to close and solution flow to cease.

To provide optimal distribution of dye solution through the flesh of the fish, needles 174 preferably extend to within about one-sixteenth inch, most preferably about one-thirty second inch of the upper surface of conveyor 98 at the extremity of the downward stroke of the manifold.

A variety of dye solutions may be used to impart a desired hue to the fish flesh subjected to the process of the invention. For imparting the salmon-red color desired for lox and other salmon products, it has been found that a suitable dye solution contains between about 75 and about 80 parts by weight F, D & C Yellow No. 6 and between about 20 and about 25 parts by weight F, D & C Red No. 40, solids basis. Most preferably, the colorant is comprised of 77.3 pbw yellow and 22.7 pbw red. To obtain the desired suffusion of natural appearing color throughout the flesh, the coloring solution should contain between about 0.6 and about 0.7 oz. total color solids per gal. of water. A lesser concentration of colorant may result in inadequate distribution of color while a greater concentration may lead to an artificial appearance.

After injection of the fish with the dye solution, the fish slabs are removed from the discharge end of conveyor 98 and placed in a conventional cure solution for a period that is preferably at least about three days. This step serves a dual role, providing a cure for the fish and causing the color to diffuse and be evenly distributed throughout the fish flesh. As a result, a highly attractive, even hue is achieved in an overall processing time of only two to three days. Moreover, by coloring whole fish or sides of fish prior to slicing a significant reduction is achieved in the labor required for processing and packing the fish.

It has further been discovered that the same type of machine utilized for injection of coloring solution into the fish flesh may be also utilized for injection of a cure. Such an operation minimizes the need for soaking in a cure bath but an aging process of two to three days is still desirable for full diffusion of the food dye and development of the overall appearance of which it is attractive to the consumer.

In order to inject cure, it has been discovered that conventional cure material may be dissolved in the dye solution so that cure and dye are injected into the fish in a single operation.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

I claim:

1. A method for coloring fish flesh comprising the steps of:
   introducing into said flesh an aqueous solution of a food dye by injecting said solution into the flesh via an array of a plurality of hypodermic needles; and
   aging the fish flesh containing said injected dye for a period of at least about two days, thereby allowing the dye to diffuse through the flesh and produce a substantially even hue therethroughout.

2. A method as set forth in claim 1 wherein said fish flesh is aged by soaking it in a curing bath.

3. A method as set forth in claim 1 wherein a curing solution is introduced into said fish flesh by injecting the curing solution into the flesh via an array of a plurality of hypodermic needles.

4. A method as set forth in claim 1 wherein the flesh of a slab of fish comprising a whole fish or fish filet is colored and said needles are caused to penetrate from one side to within approximately 1/16" of the other side of said slab.

5. A method as set forth in claim 4 wherein each of said needles has a bore of between about 0.003" and about 0.006".

6. A method as set forth in claim 5 wherein said needles are arrayed on centers spaced by between about ⅛" and about ½".

7. A method as set forth in claim 6 wherein said slab is advanced on a conveyor to a color injection station at which said needles are caused to penetrate said flesh and said solution is injected thereinto.

8. A method as set forth in claim 7 wherein said slab is passed through said injection station by means of a substantially horizontal conveyor.

9. A method as set forth in claim 8 wherein said array is mounted on a manifold above said slab, said manifold being reciprocated to and away from the slab of fish for penetration by said needles and removal thereof from the flesh.

10. A method as set forth in claim 9 wherein for each stroke of said array of needles said slab is advanced horizontally by a longitudinal distance of between about one-eighth and about one half of the dimension of the array in the direction of travel of the conveyor.

11. A method as set forth in claim 9 wherein a horizontal stripper plate is located between said manifold and said slab, said array of needles is in registry with an array of holes in said plate, and said needles move upwardly relative to said plate during movement of the manifold away from the slab, whereby the stripper plate retards upward movement of the slab and assists in withdrawal of said needles from the slab.

12. A method as set forth in claim 11 wherein said stripper plate is mounted on a yoke that is driven downwardly during the upward movement of said manifold.

13. A method as set forth in claim 12 wherein a fixed stop engages said yoke at a point on its downward travel so as to limit its downward movement and avoid damage to the fish flesh from excessive impingement thereon by the plate.

14. A method as set forth in claim 1 wherein the dye comprises an aqueous solution of a mixture which on a solids basis contains between about 75 and about 80 parts by weight yellow #6 and between about 20 and 25 parts by weight red #40.

15. A method as set forth in claim 4 wherein said dye solution contains between about 0.6 and about 0.7 ounces of color solids per gallon of water.

16. A method as set forth in claim 14 wherein said solution also contains cure material for the fish.

* * * * *